Sept. 2, 1969    H. L. BALLARD    3,464,459
WEBBINGS FOR SAFETY RESTRAINT SYSTEMS
Filed Jan. 17, 1968    2 Sheets-Sheet 1
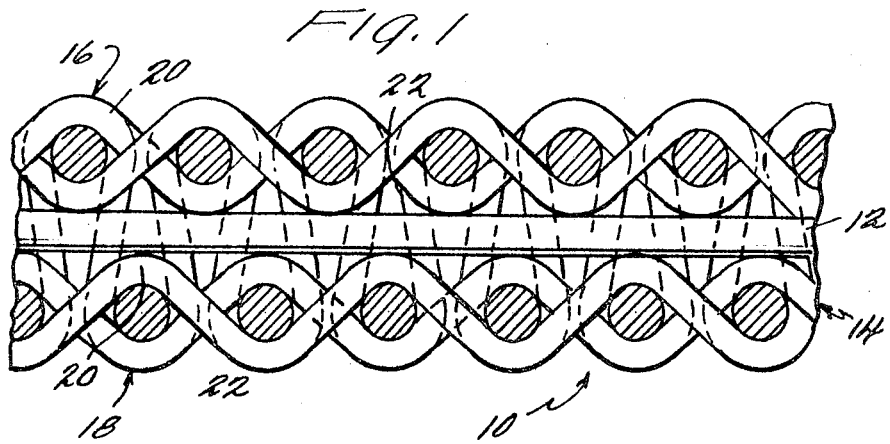
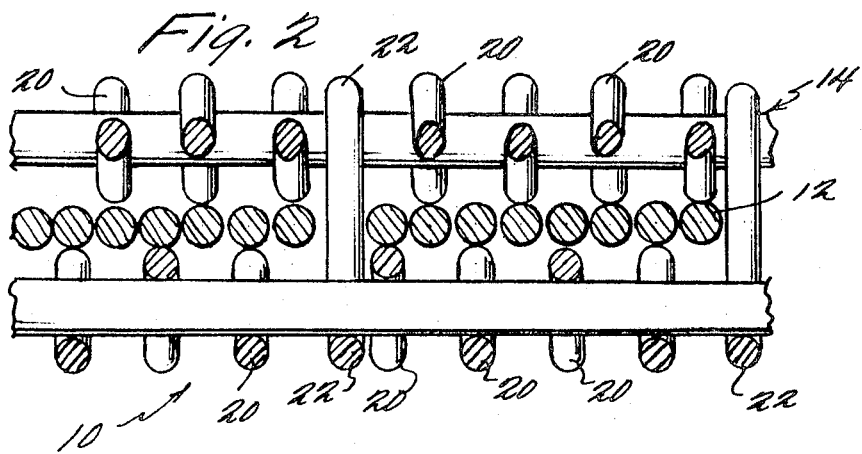
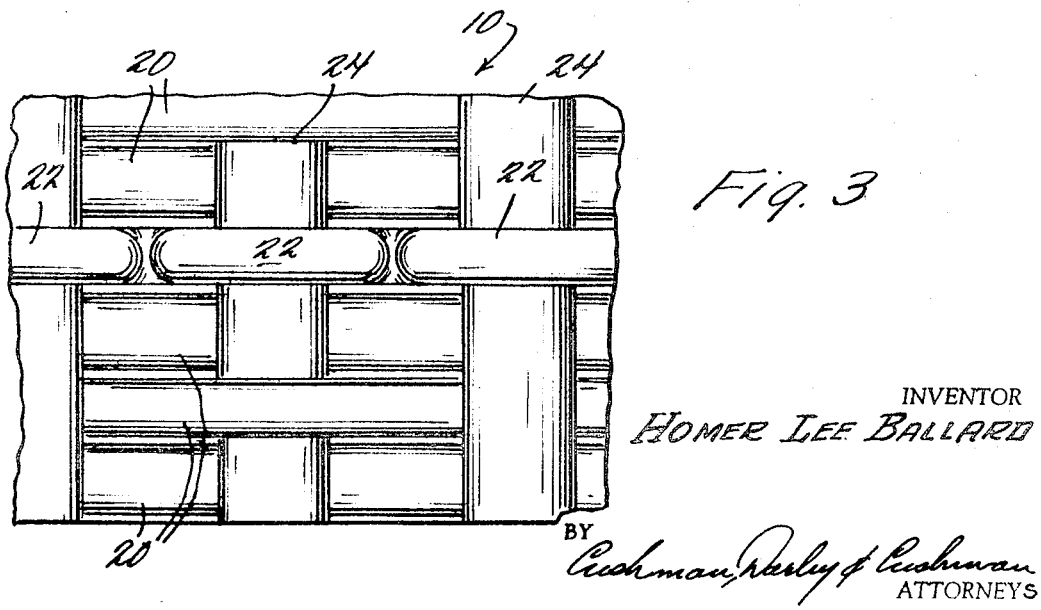
INVENTOR
HOMER LEE BALLARD
BY
Cushman, Darby & Cushman
ATTORNEYS Sept. 2, 1969   H. L. BALLARD   3,464,459
WEBBINGS FOR SAFETY RESTRAINT SYSTEMS
Filed Jan. 17, 1968   2 Sheets-Sheet 2
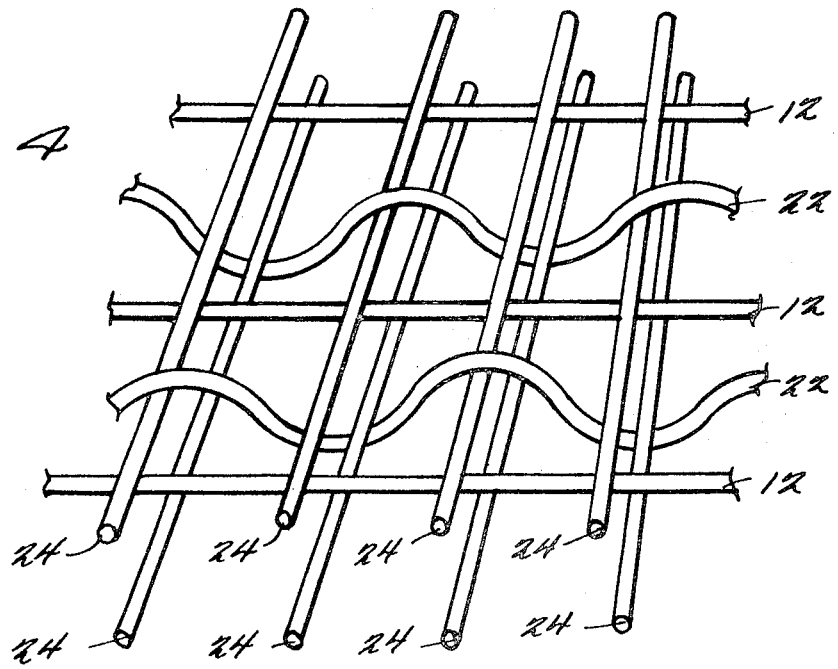
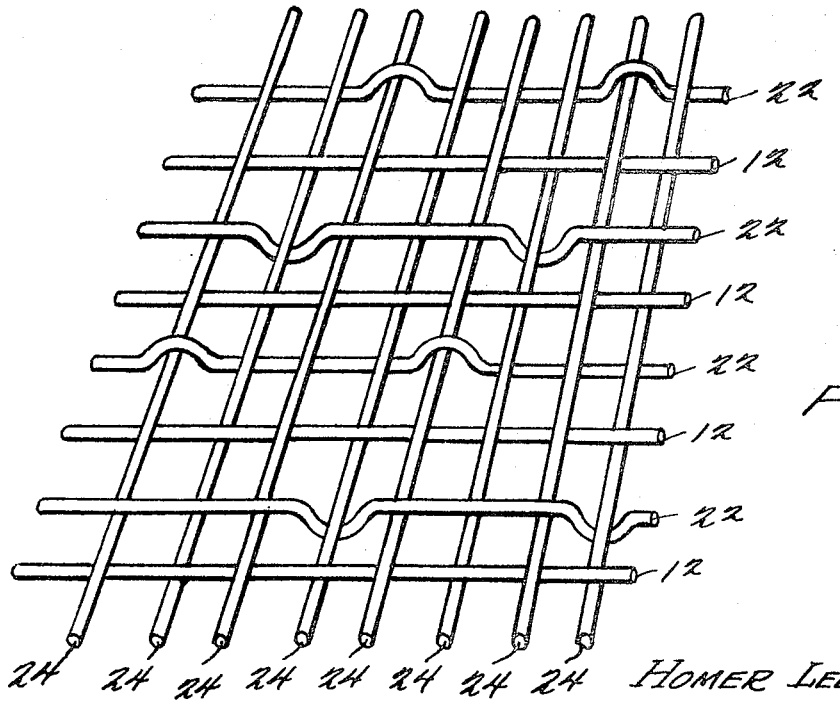
INVENTOR
HOMER LEE BALLARD United States Patent Office 3,464,459
Patented Sept. 2, 1969

3,464,459
WEBBINGS FOR SAFETY RESTRAINT SYSTEMS
Homer Lee Ballard, South Hill, Va., assignor to Burlington Industries, Inc., Greensboro, N.C., a corporation of Delaware
Filed Jan. 17, 1968, Ser. No. 698,494
Int. Cl. D03d 25/00, 23/00, 11/00
U.S. Cl. 139—383        6 Claims

ABSTRACT OF THE DISCLOSURE

The webbing includes a core yarn of relatively great strength, relatively low and/or medium elongation and having relatively medium or slow elastic recovery, placed in the webbing with a minimum of weave take-up or crimp so it is available for immediate holding protection in the event of a crash. The core yarn is completely covered by outside yarns woven with relatively high wave take-up or crimp to provide, substantially brought into play, further strength and elongation. The cover yarns also protect the core yarns against ultraviolet degradation, abrasion, and other damage during pre-crash routine use.

---

The foregoing abstract is not intended to be a comprehensive discussion of all of the principles, possible modes or applications of the invention disclosed in this document and should not be used to interpret the scope of the claims which appear at the end of this specification.

BACKGROUND OF THE INVENTION

Injuries resulting to automobile occupants during crashes, when the occupants are belted in place occur when (a) the belts stretch sufficiently during the rapidly occurring portion of the crash to allow the occupants to strike relatively more decelerated objects or portions of the automobile, (b) the belts yield insufficiently to prevent exceeding of the occupant's deceleration limitation, i.e. the occupants are squeezed hard enough against insufficiently yielding belts to cause injuries, or (c) the occupants are hit by flying objects such as articles lying in the passenger compartment, or dislodged parts of the automobile.

There is certain amount of yielding of properly worn belts which takes place in conventional safety belts because of auto seat cushion displacement and belt slack when brakes are applied suddenly or sudden deceleration. In the ordinary belt this yielding is not enough to cause the occupant to be thrown against windshield or other dangerous parts of the vehicle to cause injury to the occupant. On the other hand, if there is greater than 12 to 16% elongation under 2500 lb. load of the webbing added to the yielding of cushion displacement and slack the occupant could be severely or fatally injured by crashing into the windshield or other parts of the vehicle, although the belt still contained the occupant.

SUMMARY OF THE INVENTION

The present invention provides webbing, for seat belts or the like, including a core and a cover. The webbing is so designed and constructed that the core yarn takes the initial force yielding slowly and with low elongation up to a predetermined force that is recognized as short of the force the human body can comfortably stand by a supporting belt or shoulder harness. The core yarn then breaks slowly and the outer cover construction takes over and continues to yield slowly but continues to contain the occupant with continued support up to a further predetermined force.

The core yarn is woven in a straight line or plane with practically no weave or mechanical take-up and is ready to serve as restraining force the moment of deceleration without need for taking out undue elongation. It may be comprised of various types or combinations of yarns such as Dacron, Fortisan, HT–1 nylon, fiber glass and various other present or future yarns having great strength, low elongation, and good resistance to degradation caused by heat, age, ultraviolet and moisture.

The cover yarn is woven in such a manner that there is considerable weave take-up which is nonelastic but yields more easily than the core yarn up to a safe predetermined point. The filling yarn is of such size as to permit an even and predetermined weave take-up or crimp without depending on the warp tension entirely. The cover yarn is dyed and finished as a protection to the core yarn and with such dyes and chemicals as to protect against soiling, moisture absorption, abrasion, ultraviolet, sunlight, age and weathering degradation.

The outside cover fabric may be woven from such yarns or combination of yarns as regular high strength nylon, HT–1 nylon, polypropylene, high strength cotton and such other present or future yarns having high tenacity, good abrasion resistance, good dyeing and finishing characteristics.

It should be understood that although the webbing of the invention is particularly suitable for automobile seat belts and shoulder harnesses, its utility is not limited to these end products, but may be used wherever webbing having its characteristics could be helpful, for instance in aircraft passenger safety application; with pilot ejection inertia reels; cargo handling; with parachutes, safety nets, trampolines, and such other applications as will be apparent to those skilled in the art, after having been apprised of the attributes of the webbing of the present invention.

The webbings may best be understood from the following discussion taken in connection with the attached drawing.

The principles of the invention will be further hereinafter discussed with reference to the drawings wherein preferred embodiments are shown. The specifics illustrated in the drawings are intended to exemplify, rather than limit, aspects of the invention as defined in the claims.

BRIEF DESCRIPTION OF THE DRAWINGS

In the drawings:
FIGURE 1 is a fragmentary longitudinal vertical cross-sectional view of the belt webbing;
FIGURE 2 is a fragmentary transverse vertical cross-sectional view of the belt webbing;
FIGURE 3 is a fragmentary top plan view of the belt webbing;
FIGURE 4 is a fragmentary, somewhat exploded perspective view of the webbing embodiment of Example 3; and
FIGURE 5 is a fragmentary, somewhat exploded perspective view of the webbing embodiment of Example 4.

DESCRIPTION OF THE PREFERRED EMBODIMENT

The webbing 10 comprises an internal core or stuffer 12 covered above, below and around the extreme edges thereof by a cover 14. The cover 14 comprises face 16 and back 18, cover warp 20, binder warp 22, and filling or weft yarn 24. As is evident from FIGURES 1–3, the webbing is woven using weaves well known and common in the webbing and ribbon art with specific emphasis on the weave take-up and selection of yarn of differing characteristics for the core and cover.

The core or stuffer yarn 12 is emplaced with a minimum of take-up or crimp. In layman's terms the core yarn is straight and has little slack, so that a tensile stress applied to it at one point begins to be transmitted immediately along the core causing elongation thereof, and, should the tensile forces be great enough, breakage, i.e. failure of the core yarn. If the core yarn were kinked or crimped, initial tensile stress on the core would merely diminish the take-up or crimp slack without offering much resistance to the continued forward motion of the vehicle occupant. Although the core is shown comprising a single ply of yarn, multiple plies of identical or differing yarn may be provided in practicing the invention.

The cover 14 yarns are chosen for high strength, excellent abrasion resistance, relatively high elongation, dyeability and ability to cover the core to protect the core against wear, ultraviolet degradation and weathering during routine, preemergency use of belts, harnesses and the like made from the webbing.

The warp yarns 20, 22 are woven with relatively high weave take-up or crimp so that they will be straightening out during the period of stressing and breaking of the core and thus will not be subject to breaking stress until after the core yarns have broken.

The cover or outside filling yarns 24 are preferably of the same type yarn as the warp yarns 20, 22, though of such size as to cause the relatively high weave take-up or crimp of the warp yarns, without need for undue dependence on low weaving tension. The filling yarns 24 also give a firm cross hand to the webbing to prevent transverse folding or roping of the webbing.

A presently preferred example of the webbing of the present invention is further discussed in the following example.

EXAMPLE 1

A sample of webbing 10 was woven using the weave illustrated in FIGURES 1–3 and the following yarns:

Face and back cover warp: 185 ends of 840/136/½Z Type 6 Nylon (Polyamide)
Binder warp: 22 ends of 840/136/½Z Type 6 Nylon (Polyamide)
Core or stuffer: 180 ends of 1100/250/RO2 Dacron Type 52 (Polyester)
Filling: 33½ picks of 3 ply (840/136/½Z) 2½S Type 6 Nylon (Polyamide)

The sample was placed under tensile stress and elongated to 13 percent under 2500 pounds load. This compares with 18–20 percent elongation under 2500 pounds load for conventional, commercially available webbing. Under increased loading the core yarn of the sample broke at 4700 pounds, but the outer cover yarn then further elongated up to 10 percent and allowed further loading up to 2700 additional pounds before breaking. This compares with breakage at about 6200 pounds after elongation of as high as 50 percent for the conventional webbing.

The two-stage failure of the webbing of the invention, during a crash, should allow deceleration of the vehicle occupant at permissible rate without allowing so much forward mobility of the occupant, during the initial part of the crash when the vehicle is rapidly decelerated or wherein the vector of acceleration is radically changed, as to permit high speed contact between the occupant and the vehicle steering wheel, dashboard, doors, seat backs, windshield or the like. The behavior during a crash of belts made of the new webbing is to immediately retard movement of the occupant relative to the vehicle, at a rapid rate during the initial part of the crash, then allow somewhat greater "give" during the later stages of the crash, if needed, in order to prevent restraint offered by the belt, from doing damage to the the occupant.

Although specific yarns have been described in the example, other yarns may be similarly woven to produce webbing having the multiple-step elongation and breakage of the webbing of the invention. So long as the core yarn is provided in a substantially straight line or plane with particularly no weave or mechanical take-up and is ready to serve as restraining force the moment of deceleration without need for taking out undue elongation, it may be comprised of various types or combinations of yarns such a Dacron, Fortisan, HT–1 nylon, fiber glass and various other present or future yarns having great strength, low elongation, and good resistance to degradation caused by heat, age, ultraviolet and moisture.

The cover yarn is woven in such a manner that there is considerable weave take-up which is nonelastic but yields more easily than the core yarn up to a safe predetermined point. The filling yarn is of such size as to permit an even and predetermined weave take-up or crimp without depending on the warp tension entirely. The cover yarn is dyed and finished as a protection to the core yarn and with such dyes and chemicals as to protect against soiling, moisture absorption, abrasion, ultraviolet, sunlight, age and weathering degradation.

The outside cover fabric may be woven from such yarns or combination of yarns as regular high strength nylon, HTL nylon, polypropylene, high strength cotton and such other present or future yarns having high tenacity, good abrasion resistance, good dyeing and finishing characteristics.

The webbing of the invention may be made into seat belts and safety harnesses of wholly conventional exterior appearance, i.e. including buckles and anchor ends by conventional seat belt fabricating techniques on machines currently used in the industry for such purpose. As discussed hereinabove, the webbing, while primarily useful in vehicle occupant seat belts and safety harnesses, may be used in other applications, as will occur to those skilled in the art, where webbing having such characteristics could be used to advantage.

EXAMPLE 2

A second series of webbings was produced using the weave pattern of FIGURES 1–3 and the cover yarns of Example 1. The core yarns were beta fiber glass having an elongation of 2–4 percent at 1000–2500 pounds tensile load before core yarn breakage. Upon initiation of breakage of the core yarn at 1000 to 2500 pounds load (depending on the beta fiber glass construction), the cover yarns began to share the load in a high energy absorbing manner. The cover yarn broke at about 5000 pounds load after the webbing had elongated about 20–30 percent.

EXAMPLE 3

A third series of webbings was produced in accordance with the weave pattern of FIGURE 4 using various core and cover yarns having the characteristics and the relative relationships enumerated hereinabove. In laboratory tests of these webbings the core yarn broke at 1000–2000 pounds load with elongation of 2–3 percent, and the webbing continued gradual elongation of from 15–48 percent of the cover yarns until breakage occurred at 4500–6200 pounds load.

EXAMPLE 4

A fourth series of webbings was produced in accordance with the weave pattern of FIGURE 5, using various core and cover yarns having the characteristics and the relative relationships enumerated hereinabove. In laboratory tests of these webbings, the core yarn broke at 1000–2000 pounds load with elongation of 20–30 percent, and the webbing continued gradual elongation of from 15–35 percent of the cover yarns until breakage occurred at 4500–6200 pounds load.

It should now be apparent that the webbings for safety restraint systems as described hereinabove possess each of the attributes set forth in the specification under the heading "Summary of the Invention" hereinbefore. Because the webbings for safety restraint systems of the invention can be modified to some extent without departing from the principles of the invention as they have been outlined and explained in this specification, the present invention should be understood as encompassing all such modifications as are within the spirit and scope of the following claims.

What is claimed is:

1. Webbing, especially for vehicle occupant seat belts, safety harnesses and the like, including: at least one plane of longitudinally extending core yarn provided with a minimum of weave take-up or crimp, so as to be immediately available for holding protection in the event of longitudinal tensile stress being placed on the webbing; said core yarn having an elongation of about 13 percent at a tensile load of 2500 pounds and a breaking point of about 4700 pounds; and a woven cover of outside yarns covering said core yarn, said cover including warp yarns woven with relatively high weave take-up or crimp, about filler yarn; at least some of said warp yarns passing over filler yarn on both sides of the plane of said core yarn for securing said cover about said plane of core yarn; said cover being constructed and arranged to elongate up to about 10 percent and bear additional tensile stress after breakage of said core yarn.

2. The webbing of claim 1 wherein said cover has a breaking point of about 7400 pounds dynamic loading.

3. The webbing of claim 1 wherein the core yarn composed of at least one yarn constituent in the group consisting of polyester, nylon and glass fiber and the cover yarns are composed of at least one yarn constituent in the group consisting of nylon, polypropylene and cotton.

4. The webbing of claim 1 wherein the cover filler yarn is constructed of about 33½ picks of 3 ply (840/136/½-Z) 2½S nylon yarn; and wherein the cover warp is constructed of about 185 ends of 840/136/½Z nylon yarn on each side of the core yarn plane plus about 22 ends of 840/136/½Z nylon yarn passing over the filler yarn on both sides of said core yarn plane.

5. The webbing of claim 4 wherein the plane of core yarn is constructed of about 180 ends of 1100/250/RO2 polyethylene terephthalate yarn.

6. Manufacture of webbing, especially for vehicle occupant safety belts, harnesses and the like comprising: providing textile core yarn having an elongation of about 13 percent at a tensile load of 2500 pounds and a breaking point of about 4700 pounds, forming said textile core yarn into at least one plane of longitudinally extending textile core yarn having little take-up or crimp; providing coextensively with said plane of longitudinally extending textile core yarn, a body of textile yarn having an elongation of up to about 10 percent, woven with relatively great take-up or crimp; attaching said body of woven textile yarn facewise to said plane of longitudinally extending textile core yarn at a plurality of spaced locations along the width and length thereof, for movement therewith during preemergency, routine use of the webbing, by weaving said body about and through said plane whereby said body covers and encases said plane and whereby upon incidence of a crash, the plane of longitudinally extending textile core yarn is immediately available to provide restraint during elongation thereof and said body of woven textile yarn becomes available for providing further restraint during elongation after breakage of the yarn in said plane of longitudinally extending textile core yarn.

References Cited

UNITED STATES PATENTS

| 2,794,450 | 6/1957 | Gatzke | 139—411 |
| 3,148,710 | 9/1964 | Rieger et al. | 139—415 |
| 3,296,062 | 1/1967 | Truslow | 139—426 X |
| 3,322,163 | 5/1967 | Hughes | 139—383 |
| 3,350,037 | 10/1967 | Thompson et al. | |

FOREIGN PATENTS

| 5,020 | 1895 | Great Britain. |

OTHER REFERENCES

Man-Made Textile Encyclopedia, Textile Book Publisher, Inc., J. J. Press Editor, 1959, pp. 324–327 relied on.

Federal Specification—Belt; seat passenger type, automotive JJ-B-185A Jan. 19, 1960 (pp. 1–3); amendment July 1, 1966 (p. 1).

Dupont Textile Fibers Technical Information, Dacron Polyester Fiber Bulletin D-159, October 1962.

JAMES KEE CHI, Primary Examiner

U.S. Cl. X.R.

139—415, 426